(12) United States Patent
Okada

(10) Patent No.: US 8,548,260 B2
(45) Date of Patent: Oct. 1, 2013

(54) LEARNING APPARATUS AND OBJECT DETECTING APPARATUS

(75) Inventor: Ryuzo Okada, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 426 days.

(21) Appl. No.: 12/560,623

(22) Filed: Sep. 16, 2009

(65) Prior Publication Data

US 2010/0220922 A1 Sep. 2, 2010

(30) Foreign Application Priority Data

Mar. 2, 2009 (JP) .................................. 2009-48037

(51) Int. Cl.
*G06K 9/68* (2006.01)
*G06K 9/62* (2006.01)

(52) U.S. Cl.
USPC .......................................... 382/226; 382/159

(58) Field of Classification Search
None
See application file for complete search history.

(56) References Cited

U.S. PATENT DOCUMENTS

| 2007/0112701 A1* | 5/2007 | Chellapilla et al. | 706/15 |
| 2008/0310737 A1* | 12/2008 | Han et al. | 382/224 |
| 2009/0097739 A1* | 4/2009 | Rao et al. | 382/159 |

FOREIGN PATENT DOCUMENTS

| JP | 04-175885 | 6/1992 |
| JP | 2006-065399 | 3/2006 |

OTHER PUBLICATIONS

Takahashi, Decision-Tree-Based Multiclass Support Vector Machines, 2002, Proceedings of the 9th International Conference on Neural Information Processing (ICONIP '02). vol. 3, pp. 1418-1422.*

Geurts, Extremely Randomized Trees, 2006, Mach Learn 63(1), pp. 1-40.*

"K-means algorithm", 2008,www.wikipedia.org. [online] [retrieved on Apr. 27, 2012]. Retrieved from: http://web.archive.org/web/20080102041744/http://en.wikipedia.org/wiki/K-means.*

Japanese Office Action for Japanese Patent Application No. 2009-048037 mailed Oct. 30, 2012.

Leibe, et al Robust Object Detection with Interleaved Categorization and Segmentation, 2008, vol. 77, No. 1-3, pp. 259-289.

* cited by examiner

*Primary Examiner* — Bhavesh Mehta
*Assistant Examiner* — David F Dunphy
(74) *Attorney, Agent, or Firm* — Turocy & Watson, LLP

(57) ABSTRACT

Feature values calculated from a peripheral image area of feature points extracted in a detection target object in a training image each are labeled with a label indicating a class of the detection target object, feature values calculated from a peripheral image area of feature points of a non detection target object in the training image each are labeled with a label indicating the non detection target object, voting positions in a parameter space are calculated by relative positions of the feature points of the detection target object from the detection target object on the training image, and a first classifier is learned using the labeled feature values extracted in the training image so that a class distribution is concentrated and the voting positions in the parameter space are concentrated.

10 Claims, 7 Drawing Sheets

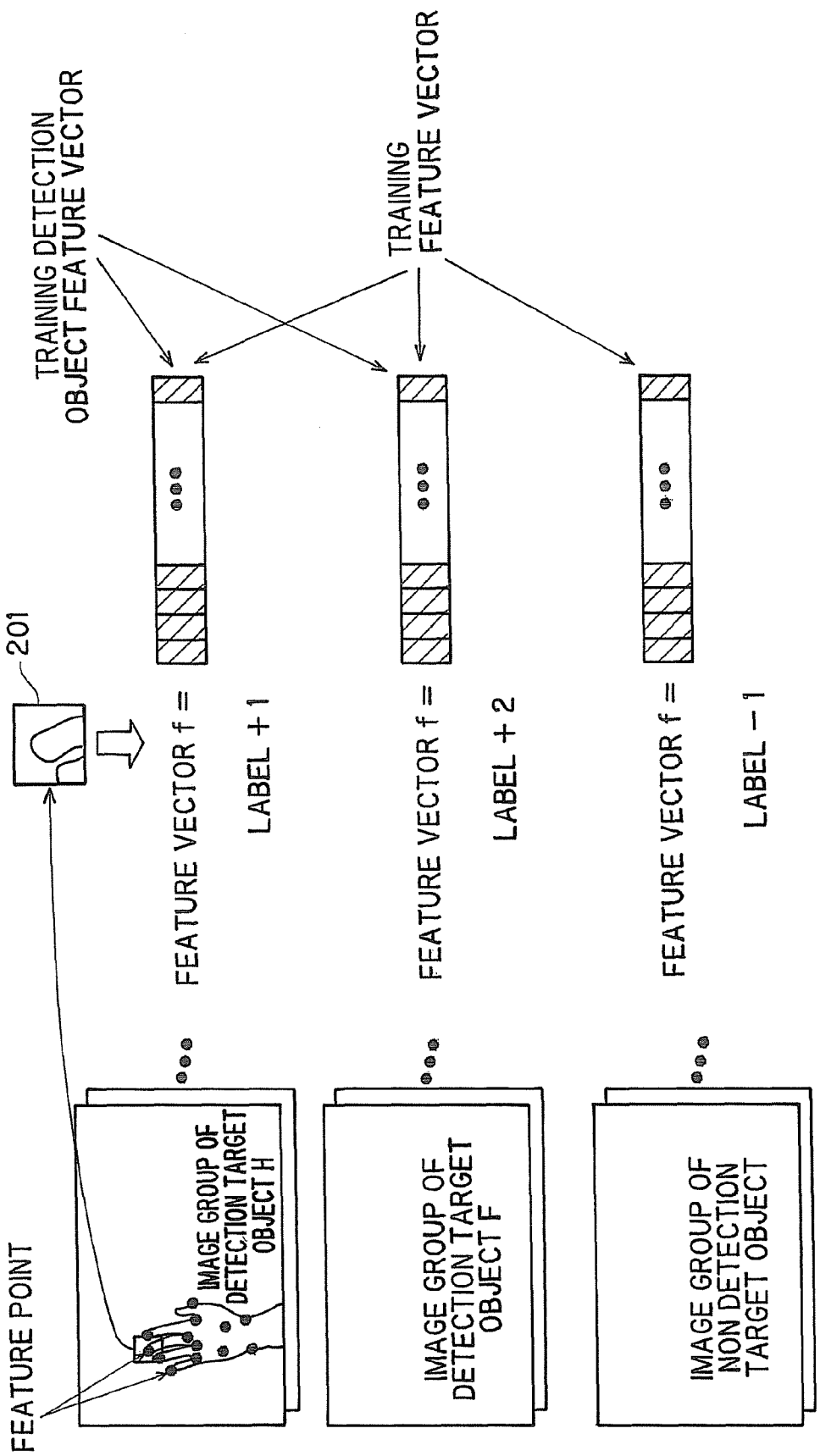

FIG. 3A
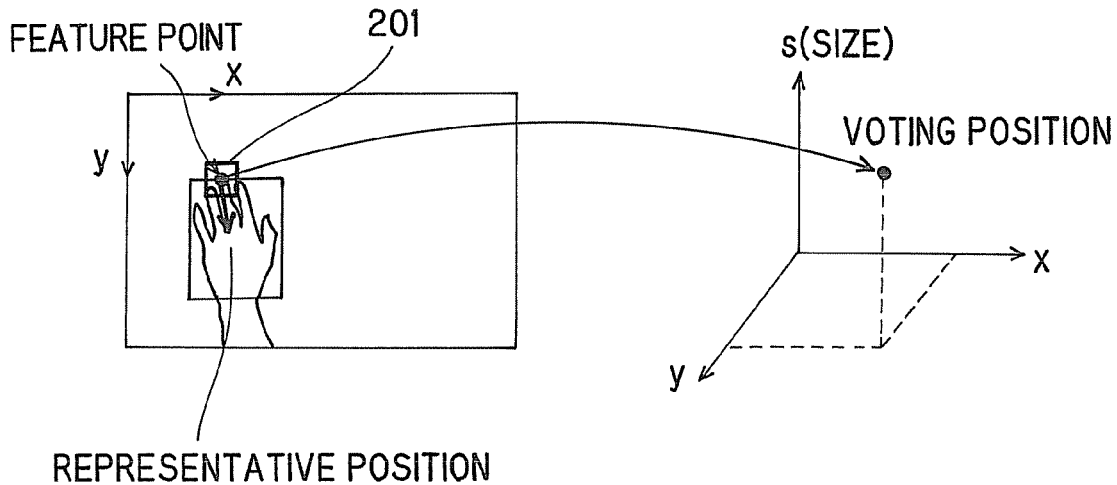
FIG. 3B
FIG. 4
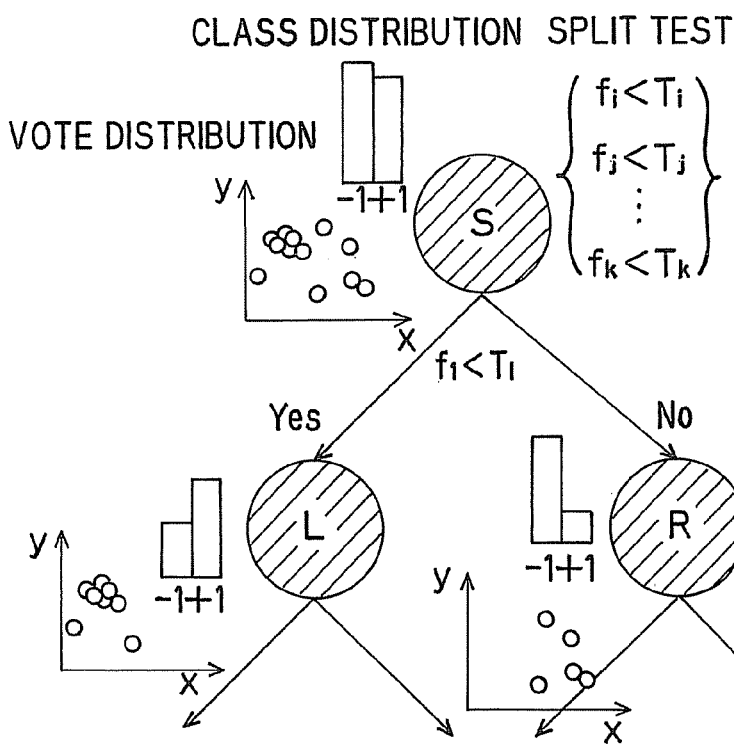

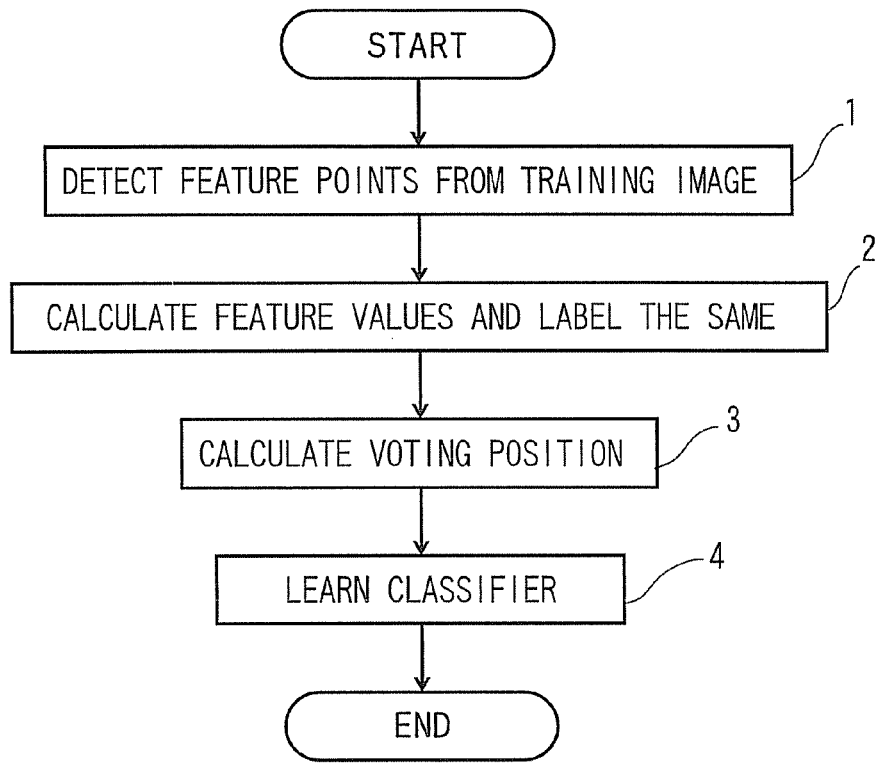
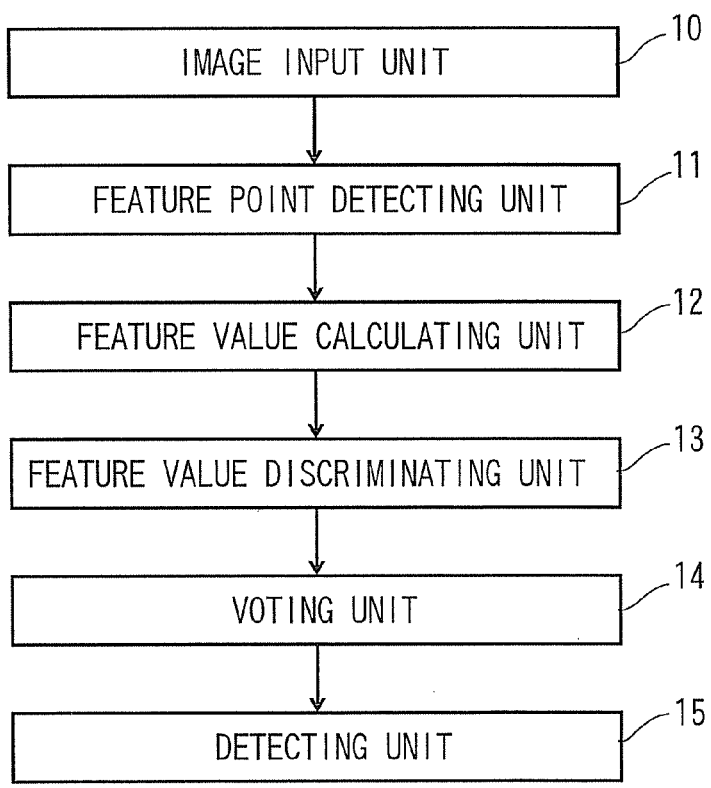

LEARNING APPARATUS AND OBJECT DETECTING APPARATUS

CROSS-REFERENCE TO RELATED APPLICATION

This application is based upon and claims the benefit of priority from the prior Japanese Patent Application No. 2009-48037, filed on Mar. 2, 2009; the entire contents of which are incorporated herein by reference.

FIELD OF THE INVENTION

The present invention relates to a technology to detect a specific object appeared in an image, and estimate a position thereof, and a technology to learn the same.

DESCRIPTION OF THE BACKGROUND

In order to detect a specific detection target object in an image without being affected by variations in appearance on the image such as a posture or a shape, there is proposed a method of learning image pattern of the detection target object consisting of a set of local features which are partial images around feature points extracted in the training sample images of the detection target object.

When learning the image pattern of the detection target object from the training sample images, relationships of parameters, such as a position, a scale, or an orientation of the detection target object, relative to the local features are stored in addition to the local features extracted from the partial images of the detection target object.

When detecting the detection target object, detection of the object and estimation of the parameters thereof are performed by matching respective local features extracted from the input images in the same manner as the time of training with the respective learned local features stored at the time of training, selecting the similar learned local features, performing voting in a parameter space such as a type, the position, the scale, or the orientation of the detection target object using the stored relative parameters, and obtaining local maxima at which voting values are sufficiently large.

In B. Leibe, A. Leonardis, B. Schiele, "Robust Object Detection with Interleaved Categorization and Segmentation", International Journal of Computer Vision, Vol. 77, No. 1-3, pp. 259-289, 2008, the object is detected by matching local features extracted from the input image with representative local features stored at the time of training, selecting the similar ones, and performing the voting in the parameter space of the position and the scale of the detection target object.

In JP-A-2006-65399, the matching of the local features is speeded-up by KD trees. Also, position and posture parameters calculated from a set of features are voted in the parameter space to obtain the position and posture of the detection target object.

In the related art, since the local features are not discriminated whether they are a part of the detection target object or not, the voting is performed from the local features which do not belong to the detection target object, and hence there arises a problem of lowering of detection accuracy.

In view of solving the problems descried above, it is an object of the invention to provide an object detecting apparatus which is able to detect a detection target object with a high degree of accuracy, a method and a program thereof, a learning apparatus therefor, and a method and a program therefor.

SUMMARY OF THE INVENTION

According to embodiments of the invention, there is provided a learning apparatus configured to learn a voting position in a parameter space and a first classifier in an object detecting apparatus, which discriminates whether feature points detected in an input image belong to a detection target object or not by the first classifier and detect the detection target object by voting for its parameters using the feature points discriminated as belonging to the detection target object, including: a feature point detecting unit configured to detect a feature point of the detection target object and a feature point of a non detection target object in the training image respectively; a feature value calculating unit configured to calculate feature values in a peripheral image area of the respective feature points detected from the training image, label the feature value calculated from the peripheral image area of the feature point extracted in the detection target object with a label indicating a class of the detection target object and label the feature value calculated from the peripheral image area of the feature point extracted in the non detection target object with a label indicating the non detection target object; a vote learning unit configured to calculate the voting position in the parameter space by the relative position of the feature point of the detection target object from the detection target object on the training image; and a classifier learning unit configured to learn the first classifier using the labeled feature values extracted in the training image so that a class distribution is concentrated and the voting positions in the parameter space are concentrated.

There is provided an object detecting apparatus including: a feature point detecting unit configured to detect a feature point from an input image; a feature value calculating unit configured to calculate feature values in a peripheral image area of the respective feature points; a feature value discriminating unit configured to discriminate whether the feature values belong to the detection target object or not using the first classifier learned by the classifier learning unit; a voting unit configured to vote for the parameter such as position and scale of the detection target object from the feature point corresponding to the feature value discriminated as a part of the detection target object so that a class distribution is concentrated and voting positions in the parameter space are concentrated according to the voting positions in the parameter space learned by the vote learning unit; and an object detecting unit configured to detect the detection target object at the voting position where a accumulated voting value is high.

According to the learning apparatus in the present invention, the voting position in the parameter space and the classifier used for the object detecting apparatus which achieves the detection of the detection target object with a high degree of accuracy are learned. Also, according to the object detecting apparatus in the invention, the detection target object is detected with a high degree of accuracy.

BRIEF DESCRIPTION OF THE DRAWINGS

FIG. 2 is an explanatory drawing showing feature points, feature vectors and labels of a detection target object and a non detection target object;

FIG. 3 is an explanatory drawing showing a position and a size in an image of the detection target object and a voting position in a parameter space;

FIG. 4 is an explanatory drawing for explaining a method of learning a random tree;

FIG. 5 is a flowchart of the learning apparatus;

FIG. 6 is a block diagram showing a configuration of an object detecting apparatus according to the first embodiment;

DETAILED DESCRIPTION OF THE INVENTION

First Embodiment

Figure 1:
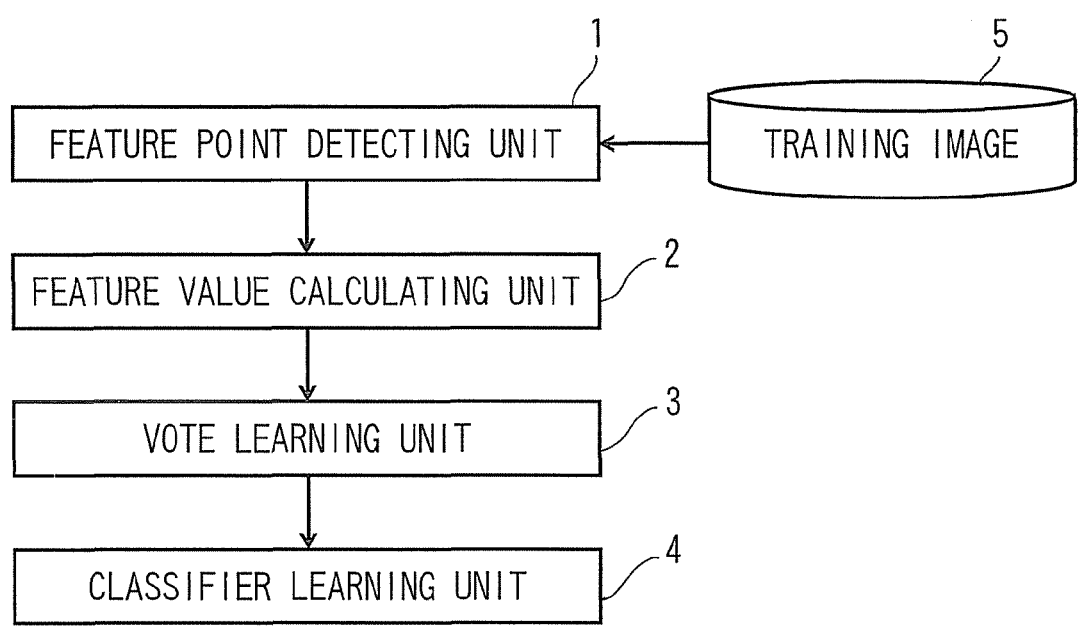
FIG. 1 is a block diagram showing a configuration of a learning apparatus according to a first embodiment of the invention.

Referring now to the drawings, a learning apparatus and an object detecting apparatus according to a first embodiment of the invention will be described.

The object detecting apparatus according to the first embodiment discriminates whether feature points detected from an input image belong to a detection target object or not by a classifier. Then, voting is performed in a parameter space including a type and the position of the detection target object for the respective feature points discriminated as belonging to the detection target object to detect the detection target object.

The learning apparatus according to the first embodiment is configured to learn a voting position in the parameter space and the classifier configured to discriminate whether the feature points belong to the detection target object or not in the object detecting apparatus from training images.

Referring now to FIG. 1 to FIG. 5, the learning apparatus according to the first embodiment will be descried.

FIG. 1 is a block diagram showing a configuration of the learning apparatus for the object detecting apparatus according to the first embodiment.

The learning apparatus includes a feature point detecting unit 1, a feature value calculating unit 2, a vote learning unit 3, and a classifier learning unit 4.

The training images consists of an image group relating to one or more detection target object(s) and an image group of objects other than the detection target objects (hereinafter, referred to as "non detection target objects") For example, as shown in FIG. 2, assuming that the detection target objects include two kinds; an object (hand) H and an object F, a training image A includes three classes; an image group in which the object H appears, the image group in which the object F appears, and an image group of the non detection target objects in which the object H and the object F do not appear. As regards the image groups of the detection target objects; the object H and the object F, it is assumed that areas where the detection target object appears in the respective images are known.

The training images may be stored in advance in a storage device 5 or may be retrieved from the outside.

The feature point detecting unit 1 detects a number of the feature points from the respective training images.

As a method of detecting the feature points, general various methods can be employed. For example, corner detectors such as a Harris corner detector, a FAST corner detector (see E. Rosten and T. Drummond, "Machine learning for high-speed corner detection" in Proc. of European Conference on Computer Vision, pp. 430-443, 2006) are used.

Also, it can also be applied to a pyramid image generated by gradually lowering a resolution of the training images.

It is also possible to employ the scale-invariant feature points which are invariant to scale change of the training images. In this case, a SIFT feature for extracting a local extreme points of a Difference of Gaussian (DoG) filter output as the feature points (see D. Lowe, "Object recognition from local scale-invariant features", in Proc. of International Conference on Computer Vision, Vol. 2, pp. 1150-1157, 1999, hereinafter referred to as "D. Lowe") or the like is used.

As shown in FIG. 2, the feature value calculating unit 2 calculates a feature vector f as the feature value relating to a peripheral image area 201 of the feature points detected by the feature point detecting unit 1. The size of the peripheral image area 201 may be a constant size such as 24 pixels square.

Also, when scale information is obtained by the scale-invariant feature detector such as the SIFT feature in the feature point detecting unit 1, the size of the peripheral image area 201 may be changed according to the scale information. The size of the peripheral image area 201 can be normalized to be a certain size, and the feature vector f is calculated from the normalized peripheral image.

General various feature values can be used as the feature vector f. For example, pixel values digitized and arranged in one-dimension, or those normalized by a mean value and variance may be employed. In addition, the SIFT feature (see D. Lowe) or the like may be used as a histogram feature robust for minute changes.

In the following description, the feature vectors f relating to all of the feature points detected from the training images are referred to as "training feature vector", and a feature vectors relating to the feature points detected from the training image areas of the respective detection target objects are referred to as "training detection object feature vector").

In order to use in the vote learning unit 3 or the classifier learning unit 4, the training detection object feature vectors are labeled for indicating a class (type) of the corresponding detection target object, and the feature vectors other than that are labeled as the non detection target objects. For example, in the case of FIG. 2, the feature vector f extracted from the image area in which the object H appears is labeled as "+1" which is a label of the object H, and the feature vector f detected from the image of the non detection target object is labeled as "−1" which is a label of the non detection target object.

The vote learning unit 3 calculates and stores voting position data in the parameter space as a voting space for each of the feature points corresponding to the training detection object feature vectors.

In the following description, a four-dimensional parameter space (r, x, y, s), including a label which indicates a class (type) r of the detection target object, a two-dimensional position (x, y) in the image, and the size s, is used. However, a higher dimensional parameter space including a posture or an orientation of the detection target object added thereto may also be employed.

In FIG. 3, a left drawing (a) shows a state in which a training image area of the detection target object (hand) H exists on an image whose position is determined by orthogonal two axes of an x-axis and a y-axis, and a right drawing (b) shows a parameter space. However, since the four-dimensional space cannot be expressed, it is shown by a three-dimensional parameter space (x, y, s) except for the label r which indicates the class of the detection target object.

As regards the class r of the detection target object, the label corresponds to a voting space, which takes two discrete voting positions of +1 and +2.

The voting position data relating to the position in the image is a two-dimensional relative vector from a feature point to a representative position of the detection target object as shown in the drawing (a) in FIG. 3. As the representative position, for example, a position of a center of gravity of the image area of the detection target object, or a center of a circumscribed rectangle.

The size of the detection target object area in the detection target image is used as the size s. For example, a width, a height, or maximum values thereof, a length of an diagonal line of a rectangle which circumscribes the detection target object area and the like are used.

The position and size used here may be a relative value normalized by a size of a peripheral image area from which the feature vector is calculated. In this manner, the voting positions in the parameter space are assigned for the respective training detection object feature vectors.

The classifier learning unit 4 learns the classifier configured to discriminate whether a given feature point detected by the object detecting apparatus belongs to the detection target object or not using the labeled training feature vector extracted by the feature value calculating unit 2.

A plurality of random trees are used as the classifier. The classifier is configured to achieve high discrimination performance for the respective random trees, in other words, configured in such a manner that a class distribution is concentrated and the voting positions in the parameter space concentrate in the parameter space.

In order to discriminate whether a given feature value belongs to the detection target object or not, it is essential that the discrimination performances of the respective random trees is high, that is, that the class distribution is concentrated. In addition, however, since the object detecting apparatus performs object detection and parameter estimation by voting in the parameter space such as the position or the posture of the detection target object, the object detection with a high degree of accuracy is achieved by providing a voting value with a sharp peak in the parameter space. The training of the random trees having the features as described above is performed as follows.

In order to simplify the description, problems of a two-class case where there is one class (one type) of the detection target object and another class of the non detection target objects will be described with reference to FIG. 4. However, the same method can be applied also in the case where there are two or more, multiple classes of the detection target objects. In FIG. 4, graphs which indicate the class distribution and drawings of the parameter space simplified into a two-dimension beside the respective nodes of the random tree.

First of all, the classifier learning unit 4 assigns all of the labeled training feature vectors f extracted by the feature value calculating unit 2 to a root node S.

The classifier learning unit 4 is operated as follows when splitting the root node S to make two child nodes L and R. First of all, as shown in FIG. 4, an element fi of the feature vectors and a threshold value Ti thereof are generated at random. Then, a split score in a case where the training feature vectors which satisfies a relationship fi<Ti are assigned temporally to the left child node L (if Yes in FIG. 4) and the labeled training feature vectors which do not satisfy the above-described relationship are assigned to the right child node R (if No in FIG. 4) is calculated. The split score indicates goodness of the split, which will be described later.

The classifier learning unit 4 repeats the operation of such temporal assignments by N-times, selects a set of the element fi and the threshold value Ti having the best split score, and actually generates the two left and right child nodes L and R using the selected element fi and the threshold value Ti.

The classifier learning unit 4 repeats recursively this split until an ending condition is satisfied. Following conditions are employed as the ending conditions. A first condition is that the number of the labeled training feature vectors included in the node is smaller than a predetermined number. A second condition is that a depth of the tree is larger than a predetermined value. A third condition is that reduction of the score which indicates the goodness of the split is smaller than a predetermined value.

The classifier learning unit 4 performs the generation of the random trees by T times to generate a plurality of the random trees (see P. Geurts, D. Ernst, and L. Wehenkel, "Extremely Randomized Trees," Machine Learning, No. 1, Vol. 36, pp. 3-42, 2006).

Subsequently, the split score which indicates the goodness of the split will be described. The split score is an integration of a degree of the concentration of the class distribution, described later, and a degree of concentration of the voting positions in the parameter space.

First of all, the concentration of the class distribution will be described.

As the goodness of the split, the concentration of the class distribution is usually used so as to improve the discrimination performance. In other words, the fact that the concentration of the class distribution is increased by performing a certain split means that training samples can be well discriminated, so that high discriminating performance for unknown labeled training feature vectors is expected.

The concentration of the class distribution can be evaluated by using an entropy, the entropy between before and after the split is considered as the reduction of the concentration of the class distribution, and a degree of reduction of entropy of the class distribution is expressed as G1 in order to grow a random tree with high discriminating performance. When an entropy of the class distribution of a parent node before the split is expressed as Hc, and entropies of the class distribution of the left and right child nodes after the split are expressed as Hl and Hr;

$$G1 = 2(Hc - Hs)/(Hc + Hs) \qquad (1)$$

$$Hs = (nL/n)Hl + (nR/n)Hr \qquad (2)$$

are satisfied, where n, nL, and nR are the numbers of the feature vectors included in the parent node, the left child node, and the right child node, Hs is an entropy after the split.

A score which evaluates the concentration of the distribution other than the entropy may be used and, for example, an score of a concentration ratio such as coefficient of variance or Gini coefficient (see YOSHIKANE, "Concentration Ratio in Bibliometrics Distribution: Concept of Concentration Ratio and Feature of Index", Japan Society of Library and Information Science, Vol. 46, No. 1, 2000. p. 18-32) may be used.

When there are two or more detection target objects, it is necessary to perform multiple class discrimination of three or more classes. From this angle, the score which evaluates the concentration of the distribution such as the entropy can calculate in the same manner even when there are multiple classes.

Subsequently, the degree of concentration of the voting positions in the parameter space will be described.

The object detecting apparatus discriminates the detected feature values via the respective random trees learned by the classifier learning unit 4, and votes at the voting position in the parameter space assigned to the training feature vectors included in a selected leaf node. Therefore, the more the voting positions voted from the respective leaf nodes concentrate in the parameter space as the voting space, the sharper the peak of the final voting results in the parameter space becomes, so that object detecting performance is improved.

The degree of concentration of the voting positions, in other words, the dispersion of the voting position can be evaluated on the basis of the variance. Therefore, in order to grow the random trees which achieve the concentrated voting, the variance of voting position for the respective detection target objects o before and after the split is considered to be the degree of concentration of the voting positions in the parameter space, and the degree of reduction of this variance is set to be G2o. Following expressions (3) and (4);

$$G2o=2(\sigma co^2-\sigma so^2)/(\sigma co^2+\sigma o^2) \quad (3)$$

$$\sigma so^2=(nLo/nTo)\sigma lo^2+(nRo/nTo)\sigma ro^2 \quad (4)$$

are satisfied, where $\sigma co^2$ is the variance of the voting position of the parent node relating to the detection target object o before the split and $\sigma lo^2$, $\sigma ro^2$ are respectively the variances of the voting positions of the left and right child nodes after the split, and nTo, nLo, nRo are the number of training detection object feature vectors relating to the detection target objects o included in the parent node, the left child node, and the right child node, respectively.

The split score is not limited to the variance, and other scores such as a standard deviation or an average deviation may also be used for the degree of concentration of the voting positions in the parameter space.

When there are two or more detection target objects, the degree of concentration G2o of the voting position in the parameter space is calculated for each of the detection target objects o.

A split score G in which the degree of the concentration of the class distribution and that of the voting positions in the parameter space are integrated by the weighted sum of a degree of reduction G1 of the concentration of the class distribution and a degree of reduction G2 of concentration of the voting positions in the parameter space as shown by an expression (5) below.

$$G=G1+\Sigma o(w(\gamma o)*G2o) \quad (5)$$

Here, a function $w(\gamma o)$ of a detection target object ratio $\gamma o=nTo/n$ is used as a weight for the degree of reduction G2o of concentration of the voting positions in the parameter space. The detection target object ratio $\gamma o=nTo/n$ is a ratio of the number of training detection object feature vectors nTo relating to the respective detection target objects o to the total number of training feature vectors n in the parent node of the random tree. As the function $w(\gamma o)$, $w(\gamma o)=\gamma o$, $w(\gamma o)=a*\gamma o$, $w(\gamma o)=\max(\gamma o-b, 0)$, and so on are used, where a and b are prefixed constants.

By using the split score G, the random tree in which both the discrimination performance and the concentration of the voting positions are achieved can be configured.

At the nodes close to the root node S of the tree, the detection target object ratio $\gamma o$ is relatively small, and the split giving priority to the discrimination performance is performed. At the nodes at deeper positions in the tree, there exist the nodes which have a large ratio of detection target objects and the nodes which have a small ratio of detection target objects. However, at the nodes which have the large the detection target object ratio $\gamma o$, even when the improvement of the discriminating performance (increase in the concentration of the class distribution G1) becomes small, the split of the nodes is performed as long as the voting positions are dispersed and the split making an attempt to concentrate the voting positions is continuously performed.

Referring now to a flowchart in FIG. 5, the process of the learning apparatus will be described.

In Step 1, the feature point detecting unit 1 receives an input of the training images including the images relating to one or more of the detection target object(s) and the images of the non detection target objects and detects a number of feature points relating to the respective training images.

In Step 2, the feature value calculating unit 2 calculates the feature values relating to the feature points and the peripheral image area 201 as shown in FIG. 2, and labels the feature values relating to the feature points detected from the training image areas of the respective detection target objects with labels which indicate the corresponding classes of the detection target objects, and labels the feature values other than that with labels of the non detection target object.

In Step 3, the vote learning unit 3 calculates and stores the voting positions of the respective feature points labeled as the detection target object in the parameter space.

In Step 4, the classifier learning unit 4 learns the classifier configured to discriminate whether the feature points detected by the object detecting apparatus belong to the specified detection target object or not using the labeled feature values extracted by the feature value calculating unit 2.

Figure 7:
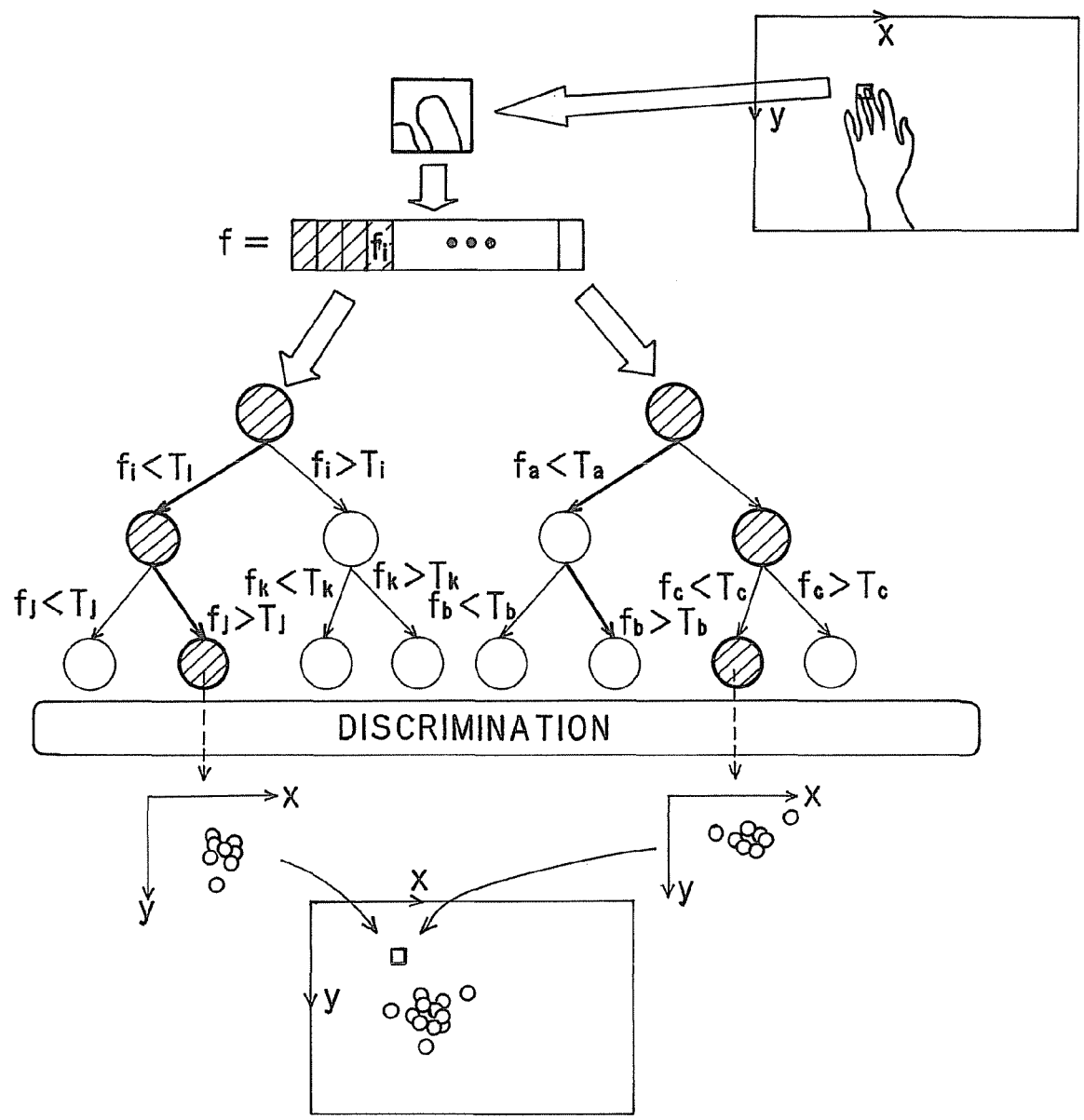
FIG. 7 is an explanatory drawing for explaining a flow of a process of the object detecting apparatus.
Figure 8:
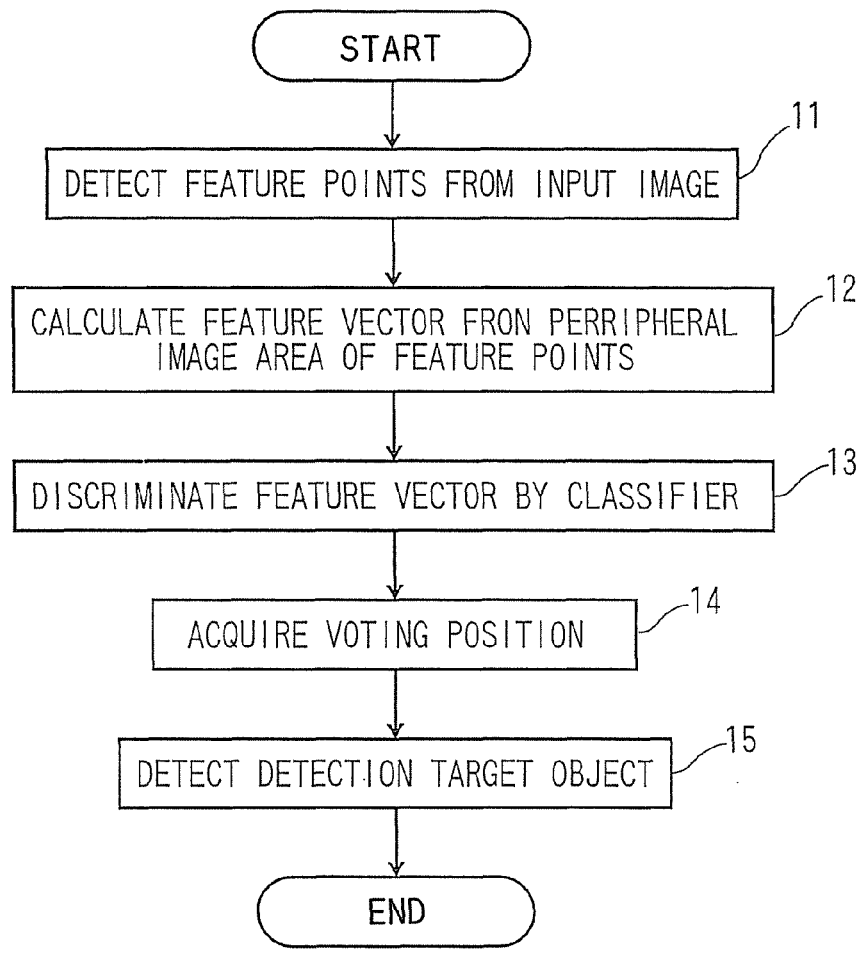
FIG. 8 is a flowchart of the object detecting apparatus.

Referring now to FIG. 6 to FIG. 8, the object detecting apparatus according to the first embodiment will be described.

FIG. 6 is a block diagram showing a configuration of the object detecting apparatus according to the first embodiment of the invention.

The object detecting apparatus includes an image input unit 10, a feature point detecting unit 11, a feature value calculating unit 12, a feature value discriminating unit 13, a voting unit 14, and a detecting unit 15.

Images are inputted to the image input unit 10 from a camera or the like.

The feature point detecting unit 11 and the feature value calculating unit 12 detect feature points from the input images as shown in FIG. 7 in the same manner as the feature point detecting unit 1 and the feature value calculating unit 2 of the learning apparatus, and calculate feature vector relating to a peripheral image area thereof. Since the feature point detecting unit 11 and the feature value calculating unit 12 perform the same process as the learning apparatus as described above, the description is omitted.

The feature value discriminating unit 13 uses the plurality of random trees generated by the classifier learning unit 4 to discriminate whether respective feature values belong to the respective detection target objects or not.

The voting unit 14 votes the feature points corresponding to the feature values which are discriminated as the detection target object in the feature value discriminating unit 13 according to the voting positions in the parameter space learned by the vote learning unit 3.

The object detecting unit 15 detects objects according to a result of voting.

The feature value discriminating unit 13 discriminates the respective feature vectors calculated by the feature value calculating unit 12 via each of the plurality of random trees learned by the classifier learning unit 4.

In other words, according to the result of the discrimination at the each node, for example if the split test (fi<Ti) is satisfied, proceeding to the left node, the tree structure is followed until reaching a leaf node.

The frequency of each labels is counted with respect to the training feature vectors belonging to a leaf node, and when the frequency of the label corresponding to the detection target object o is the largest, the result of discrimination via this random tree is determined to be the detection target object o.

The discrimination via the random tree as described above is performed for the plurality of random trees learned by the classifier learning unit 4 and, if the ratio of the random trees which has discriminated the feature vector to be the detection target object o is not smaller than the threshold value, the corresponding feature vector is finally determined to be part of the detection target object o.

In the feature value discriminating unit 13, as regards a feature vector which is discriminated to be a part of a certain detection target object o, the leaf node which the feature vector has reached when it is discriminated via the random tree is known.

The voting unit 14 acquires the voting position of the detection target object o in the parameter space which is learned in advance by the vote learning unit 3 as regards the training detection object feature vector relating to the detection target object o which is assigned to the leaf node.

In particular, the voting position data relating to the position in the image will be described. As shown in FIG. 3, when the voting position data relating to the position is the two-dimensional relative vector from the feature point to the representative position of the detection target object, the voting is performed at a position obtained by adding the relative vector to the position of the feature point corresponding to the feature vector which is discriminated as the detection target object on the image.

The voting value may be a constant value in terms of the respective training detection object feature vectors or, alternatively, the detection target object ratio γo of the leaf node which the feature vector has reached, the ratio of the random trees which has discriminated the feature vector to be the detection target object o via the feature value discriminating unit 13, the product thereof, or a value normalized by dividing them by the number of the training detection object feature vectors relating to the detection target object o which belong to the leaf node which the feature vector has reached are used.

The voting process as described above is performed for the parameter spaces corresponding to the respective detection target objects for all of the feature vectors discriminated to be a part of any detection target objects by the feature value discriminating unit 13 from among the feature vectors detected by the feature value calculating unit 12. No voting is performed for the feature vectors discriminated as the non detection target object.

The object detecting unit 15 detects the detection target object using the voting value in the parameter space.

Simply speaking, a local maxima at which the voting value is not smaller than the threshold value is detected.

When the number of feature vectors detected by the feature value calculating unit 12 fluctuates significantly depending on the images, normalizing of the voting value may be performed by dividing the maximum value by the number of feature vectors which have voted to the maximum point.

Referring now to a flowchart in FIG. 8, the process of the object detecting apparatus will be described.

In Steps 11, the feature point detecting unit 11 detects the feature points from the input image.

In Step 12, the feature value calculating unit 12 calculates the feature vectors relating to the peripheral image area 201 of the feature points.

In Step 13, the feature value discriminating unit 13 discriminates the respective feature vectors calculated by the feature value calculating unit 12 via the plurality of random trees as the classifier learned by the classifier learning unit 4.

In Step 14, the voting unit 14 acquires the voting position of the detection target object o in the parameter space which is learned in advance by the vote learning unit 3 as regards the training detection object feature vector relating to the detection target object o which is assigned to the leaf node which the feature vector has reached.

In Step 15, the object detecting unit 15 detects the detection target object using the voting value in the parameter space.

Second Embodiment

Figure 9:
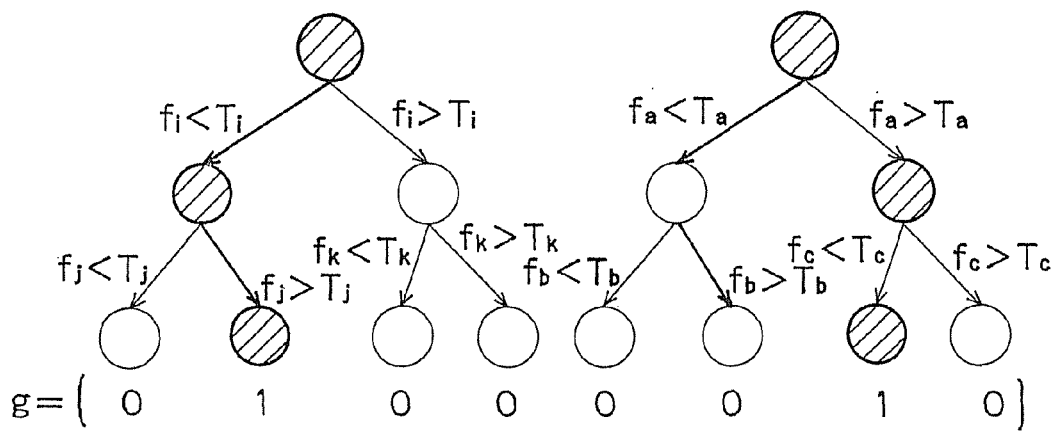
FIG. 9 is an explanatory drawing showing binary vectors which are inputs to a second classifier according to a second embodiment.

Referring now to FIG. 9, the object detecting apparatus and the learning apparatus according to a second embodiment will be described.

Referring now to FIG. 9, the learning apparatus according to the second embodiment will be described.

The learning apparatus according to the second embodiment learns a second classifier in addition to the classifier including the plurality of random trees learned by the classifier learning unit 4 in the first embodiment (hereinafter, referred to as "first classifier").

First of all, as shown in FIG. 9, as a result of discrimination of the training feature vectors via the respective random trees of the first classifier, the selected leaf node takes a value of +1, and the leaf nodes other than that take a value of 0, so that binary vectors g are obtained by concatenating the binary vectors from the plurality of random trees. Subsequently, the second classifier is learned by using the binary vectors g.

In other words, the binary vectors g calculated from all of the labeled training feature vectors are used for training the second classifier. As the second classifier, a general classifier can be used. For example, Support Vector Machine, Neural Network, or AdaBoost are used.

When there are two or more detection target objects, the second classifier is needed to discriminate multiple classes; three or more classes. When a binary classifier is used for the classifier, multiple class discrimination is achieved by combining a plurality of the binary classifiers. In other words, there is a method of training the binary classifier which discriminates a certain class and classes other than that class, or a method of training the binary classifiers which discriminate a certain class and another different class.

The object detecting apparatus according to the second embodiment will be described.

In the object detecting apparatus according to the second embodiment, the respective feature vectors extracted by the feature value calculating unit 12 are discriminated by the first classifier and the second classifier as the plurality of random trees learned by the classifier learning unit 4 in the feature value discriminating unit 13.

The first classifier performs the discrimination in the same manner as in the first embodiment. Since the second classifier outputs discrimination values which indicate a likelihood of the detection target object, it discriminates the feature vector to be a part of the detection target object when the discrimination value is larger than the threshold value.

The discrimination values of the second classifier may additionally used for calculation of the voting value in the voting unit 14.

Third Embodiment

Figure 10:
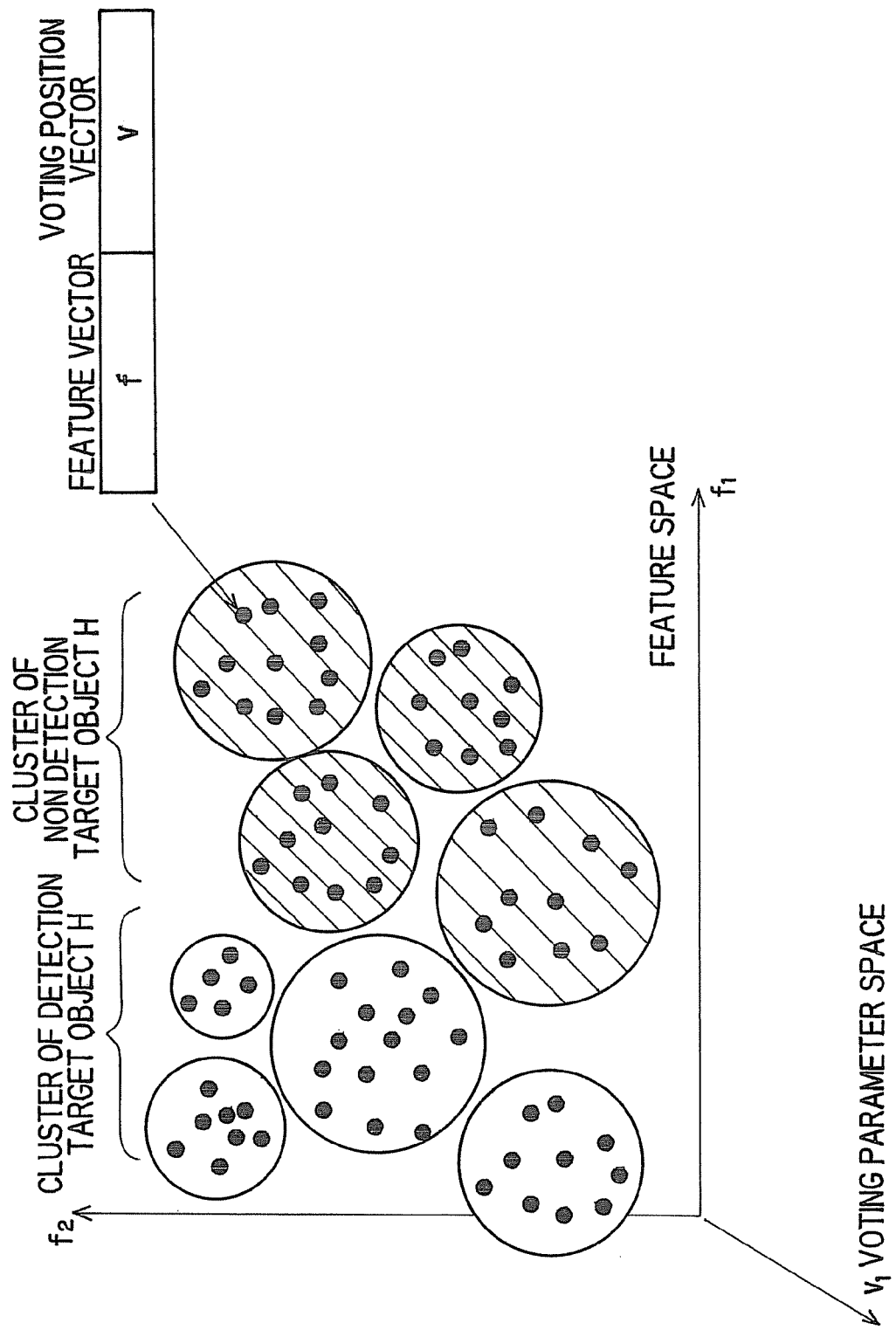
FIG. 10 is an explanatory drawing showing a parameter space according to a third embodiment.

Referring now to FIG. 10, the object detecting apparatus and the learning apparatus according to a third embodiment will be described.

As shown in the first embodiment, other classifiers may be used also in a case other than that where the plurality of random trees are used as the classifiers of the feature values. In the third embodiment, a case where a nearest neighbor classifier is used will be described.

Referring now to FIG. 10, the learning apparatus according to the third embodiment will be described.

In the learning apparatus according to the third embodiment, the classifier learning unit 4 splits all of the training feature values into k clusters by Vector Quantization Method such as k-means clustering.

The k-means clustering initializes each of the cluster using a randomly chosen vector data as an initial member of different cluster, and calculates an average of the respective clusters by this assignment. Distances between the respective vectors and the average of the respective clusters are obtained, and the respective vectors are reassigned to the clusters having nearest average values. When there is no change in allocation of all of the vectors to the clusters after the process as described above, the process is ended. In other cases, the process is repeated.

The classifier learning unit 4 applies the k-means clustering separately for the training detection object feature vectors and the feature vectors of the non detection target objects, and generates K clusters for the detection target objects and K' clusters for the non detection target objects.

When applying the k-means clustering for the training detection object feature vectors, an average value of respective elements of the feature vectors assigned to the clusters and Euclidean distance are usually used in the k-means clustering. In the current invention, a cluster average value or a data-to-data distance are defined so that the voting positions of the training detection object feature vectors classified into the respective clusters concentrate.

As shown in FIG. 10, combined vectors in which elements f1, f2 of the feature vector and a voting position v are combined are defined, and the k-means clustering is performed using the average of the combined vectors and the Euclidean distance.

Accordingly, each cluster includes a set of the feature vectors which are similar to each other and whose voting position in the parameter space is also similar to each other. In the respective clusters, an average value of the feature vectors assigned to the clusters is calculated and is set as a representative feature vector.

The object detecting apparatus according to the third embodiment will be described.

In the object detecting apparatus according to the third embodiment, the respective feature vectors extracted by the feature value calculating unit 12 are matched with the representative feature vector generated by the classifier learning unit 4 in the feature value discriminating unit 13 by the nearest neighbor classifier, and (a plurality of) the representative feature vectors which are close to each other in terms of distance are selected.

When the selected representative vectors belong to the cluster of the non detection target objects, the corresponding feature vectors are determined to be the non detection target objects, and hence no voting is performed.

When the selected representative vectors belong to the cluster of the detection target objects, the corresponding feature vectors are determined to be a part of the detection target objects.

The voting unit 14 obtains a representative feature vector which is close in terms of the distance from the feature vector discriminated as a part of the detection target object. The voting unit 14 obtains the training detection object feature vector assigned to the cluster corresponding to this representative feature vector. Then, the voting unit 14 acquires the voting position in the parameter space learned by the vote learning unit 3 for this training detection object feature vector. The voting unit 14 votes the voting value to the voting position in the parameter space.

The voting value is a constant value for the respective training detection object feature vectors, a similarity with respect to the representative feature vector, and a normalized value obtained by dividing these values by the number of training detection object feature vectors included in the cluster.

The invention is not limited to the respective embodiments described above, and may be modified variously without departing the scope of the invention.

The learning apparatus and the object detecting apparatus in the respective embodiments described above may also be realized by using a general-purpose computer as basic hardware. For example, the feature point detecting unit 1, the feature value calculating unit 2, the vote learning unit 3, and the classifier learning unit 4 of the learning apparatus, and the image input unit 10, the feature point detecting unit 11, the feature value calculating unit 12, the feature value discriminating unit 13, the voting unit 14, and the detecting unit 15 of the object detecting apparatus may be realized by causing a processor mounted on the computer to execute a program. At this time, the learning apparatus and the object detecting apparatus may be realized by installing the program in the computer in advance, or may be realized by storing the same in a storage medium such as a CD-ROM or by distributing the program via a network and installing the program in the computer as needed.

What is claimed is:

1. A learning apparatus configured to learn a voting position in a parameter space and a first classifier in an object detecting apparatus, which discriminates whether feature points detected in an input image belong to a detection target object or not by the first classifier using a plurality of random trees and detects the detection target object by voting for its parameters using the feature points discriminated as belonging to the detection target object, comprising:
 a feature point detecting unit configured to detect a feature point of the detection target object and a feature point of a non detection target object in the training image respectively;
 a feature value calculating unit configured to calculate feature values in a peripheral image area of the respective feature points detected from the training image, label the feature value calculated from the peripheral image area of the feature point extracted in the detection target object with a label indicating a class of the detection target object, and label the feature value calculated from the peripheral image area of the feature point extracted in the non detection target object with a label indicating the non detection target object;
 a vote learning unit configured to calculate the voting position in the parameter space by the relative position of the feature point of the detection target object from the detection target object on the training image; and
 a classifier learning unit configured to learn the first classifier using the labeled feature values of the training image so that a class distribution of the class is concentrated and the voting positions in the parameter space are concentrated, at nodes at deeper positions in the random tree,
 wherein the classifier learning unit:
 splits a parent node of the random tree using a weighted sum of a degree of reduction of an entropy of the class distribution and a degree of reduction of a variance of the voting positions in the parameter space; and the weight to the degree of reduction of the variance of the voting positions is a function of a detection target object ratio, and the detection target object ratio is a ratio of the number of feature values corresponding to the detection target object to the number of all of the feature values which belong to the nodes of the random trees.

2. The learning apparatus according to claim 1, wherein the classifier learning unit:

learns a second classifier in addition to the first classifier;

discriminates the labeled feature values by the first classifier via the random trees, so that a leaf node selected as the detection target object takes a first value, and the leaf nodes other than that take a second value which is different from the first value, and a binary vector as a concatenation of the first values and the second values obtained from the plurality of random trees are obtained; and uses the binary vectors to learn the second classifier.

3. An object detecting apparatus comprising:

a feature point detecting unit configured to detect a feature point from an input image;

a feature value calculating unit configured to calculate feature values of the feature point and a peripheral image area thereof;

a feature value discriminating unit configured to discriminate whether the feature values belong to the detection target object or not using the first classifier learned by the learning apparatus according to claim 2;

a voting unit configured to vote the feature point corresponding to the feature value discriminated as the detection target object so that a class distribution of a class of the detection target object is concentrated and the voting positions in the parameter space concentrate according to the voting position in the parameter space learned by the learning apparatus according to claim 2; and an object detecting unit configured to detect the detection target object at the voting position where a voted voting value is high wherein the feature value discriminating unit:

calculates the respective feature values obtained from the input image by the first classifier to calculate the binary vectors;

inputs the binary vectors to the second classifier according to claim 2; and discriminates whether the feature values belong to the respective detection target object or not.

4. The object detecting apparatus according to claim 3, wherein the voting unit votes a voting value which is proportional to any one of a detection target object ratio of a leaf node discriminated as the detection target object by discriminating the respective feature values obtained from the input image via the random trees, a ratio of the random trees which discriminate the feature vector to be the detection target object and a discrimination value which indicates the likelihood of the detection target object from the second classifier, or a combination thereof in the parameter space.

5. An object detecting apparatus comprising:

a feature point detecting unit configured to detect a feature point from an input image;

a feature value calculating unit configured to calculate feature values of the feature point and a peripheral image area;

a feature value discriminating unit configured to discriminate whether the feature values belong to the detection target object or not using the first classifier learned by the learning apparatus according to claim 1;

a voting unit configured to vote the feature point corresponding to the feature value discriminated as the detection target object so that a class distribution of a class of the detection target object is concentrated and the voting positions in the parameter space concentrate according to the voting position in the parameter space learned by the learning apparatus according to claim 1; and an object detecting unit configured to detect the detection target object at the voting position where a accumulated voting value is high.

6. The object detecting apparatus according to claim 5, wherein the voting unit votes a voting value which is proportional to any one of a detection target object ratio of a leaf node discriminated as the detection target object by discriminating the respective feature values obtained from the input image via the random trees, a ratio of the random trees which discriminate the feature vector to be the detection target object and a discrimination value which indicates the likelihood of the detection target object from the second classifier, or a combination thereof in the parameter space.

7. A learning method for learning a voting position in a parameter space and a first classifier in an object detecting method, the object detecting method for discriminating whether a feature point detected from an input image belongs to a detection target object or not by the first classifier using a plurality of random trees and detecting the detection target object by voting the feature point discriminated as belonging to the detection target object in the parameter space configured with relative positions on a training image, comprising:

detecting a feature point of the detection target object and a feature point of a non detection target object in the training image respectively;

calculating feature values in a peripheral image area of the respective feature points detected from the training image, labeling the feature value relating to the peripheral image area of the feature point of the detection target object with a label indicating a class of the detection target object, and labeling the feature value relating to the peripheral image area of the feature point of the non detection target object with a label indicating the non detection target object;

calculating the voting position in the parameter space by the relative position of the feature point of the detection target object from the detection target object on the training image; and learning the first classifier using the labeled feature values of the training image so that a class distribution of the class is concentrated and the voting positions in the parameter space concentrate, at nodes at deeper positions in the random tree;

using a plurality of random trees as the first classifier, and when learning the first classifier; and splitting a parent node of the random tree using a weighted sum of a degree of reduction of an entropy of the class distribution and a degree of reduction of a variance of the voting positions in the parameter space, wherein the weight to the degree of reduction of the variance of the voting positions is a function of a detection target object ratio, and the detection target object ratio is a ratio of the number of feature values corresponding to the detection target object to the number of all of the feature values which belong to the nodes of the random trees.

8. An object detecting method comprising:

detecting a feature point from an input image;

calculating feature values of the feature point and a peripheral image area thereof;
discriminating whether the feature values belong to the detection target object or not using the first classifier learned by learning method according to claim 7;
voting the feature point corresponding to the feature value discriminated as the detection target object so that a class distribution of a class of the detection target object is concentrated and the voting positions in the parameter space concentrate according to the voting position in the parameter space learned by the learning method according to claim 7; and
detecting the detection target object at the voting position where a voted voting value is high.

9. A learning program for learning a voting position in a parameter space and a first classifier in an object detecting program, the object detecting program being configured to discriminate whether a feature point detected from an input image belongs to a detection target object or not by the first classifier using a plurality of random trees and detecting the detection target object by voting the feature point discriminated as belonging to the detection target object in the parameter space configured with relative positions on a training image, the learning program being stored in a non-transitory computer readable media and the program causing a computer to realize the instructions of:
detecting a feature point of the detection target object and a feature point of a non detection target object in the training image respectively;
calculating feature values in a peripheral image area of the respective feature points detected from the training image, labeling the feature value relating to the peripheral image area of the feature point of the detection target object with a label indicating a class of the detection target object, and labeling the feature value relating to the peripheral image area of the feature point of the non detection target object with a label indicating the non detection target object;
calculating the voting position in the parameter space by the relative position of the feature point of the detection target object from the detection target object on the training image; and
learning the first classifier using the labeled feature values of the training image so that a class distribution of the class is concentrated and the voting positions in the parameter space concentrate, at nodes at deeper positions in the random tree;
using a plurality of random trees as the first classifier, and when learning the first classifier; and
splitting a parent node of the random tree using a weighted sum of a degree of reduction of an entropy of the class distribution and a degree of reduction of a variance of the voting positions in the parameter space,
wherein the weight to the degree of reduction of the variance of the voting positions is a function of a detection target object ratio, and the detection target object ratio is a ratio of the number of feature values corresponding to the detection target object to the number of all of the feature values which belong to the nodes of the random trees.

10. An object detecting program stored in a non-transitory computer readable media, the program causing a computer to realize the instructions of:
detecting a feature point from an input image;
calculating feature values of the feature point and a peripheral image area thereof;
discriminating whether the feature values belong to the detection target object or not using the first classifier learned by the learning program according to claim 9;
voting the feature point corresponding to the feature value discriminated as the detection target object so that a class distribution of a class of the detection target object is concentrated and the voting positions in the parameter space concentrate according to the voting position in the parameter space learned by the learning program according to claim 9; and
detecting the detection target object at the voting position where a voted voting value is high.

* * * * *